(12) United States Patent
Song et al.

(10) Patent No.: US 11,940,418 B2
(45) Date of Patent: Mar. 26, 2024

(54) PORTABLE SYSTEM FOR PZT-BASED INSPECTION OF BOLTED CONNECTIONS

(71) Applicant: University of Houston System, Houston, TX (US)

(72) Inventors: Gangbing Song, Pearland, TX (US); Jinwei Jiang, Houston, TX (US); Siu Chun Michael Ho, Sugar Land, TX (US); Zheng Chen, Sugar Land, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 452 days.

(21) Appl. No.: 17/286,201

(22) PCT Filed: Oct. 18, 2019

(86) PCT No.: PCT/US2019/056866
§ 371 (c)(1),
(2) Date: Apr. 16, 2021

(87) PCT Pub. No.: WO2020/081894
PCT Pub. Date: Apr. 23, 2020

(65) Prior Publication Data
US 2021/0356436 A1    Nov. 18, 2021

Related U.S. Application Data

(60) Provisional application No. 62/747,382, filed on Oct. 18, 2018.

(51) Int. Cl.
*G01N 29/04* (2006.01)
*G01N 29/09* (2006.01)
(Continued)

(52) U.S. Cl.
CPC ......... *G01N 29/245* (2013.01); *G01N 29/043* (2013.01); *G01N 29/09* (2013.01);
(Continued)

(58) Field of Classification Search
CPC ............ G01N 29/00; G01N 29/04–12; G01N 29/043; G01N 29/22; G01N 29/226;
(Continued)

(56) References Cited

U.S. PATENT DOCUMENTS

| 7,698,949 B2 * | 4/2010 | Akdeniz | ............ G01N 29/2475 |
| | | | 73/632 |
| 8,671,761 B2 * | 3/2014 | Zagrai | ................ G01N 29/4427 |
| | | | 73/598 |

(Continued)

FOREIGN PATENT DOCUMENTS

| CN | 101526505 | 9/2009 |
| CN | 203772810 U | 8/2014 |

(Continued)

OTHER PUBLICATIONS

Park, et al., "Feasibility of using impedance-based damage assessment for pipeline structures", Earthquake Engineering and Structural Dynamics, 2001, 30, pp. 1463-1474.

(Continued)

*Primary Examiner* — Nguyen Q. Ha
(74) *Attorney, Agent, or Firm* — Jackson Walker LLP

(57) ABSTRACT

A portable inspecting device includes PZT transducers and performs active sensing to measure the characteristics of bolted connections. The PZT transducers are mounted on opposing ends of spring-loaded rods and can be moved apart to accommodate a structure for testing. The springs cause the PZT transducers to push against opposing parts of the structure in a stable but temporary fashion. The device can (Continued)

be physically moved to inspect the status and health of multiple different bolted connections.

13 Claims, 3 Drawing Sheets

(51) Int. Cl.
  *G01N 29/12* (2006.01)
  *G01N 29/22* (2006.01)
  *G01N 29/24* (2006.01)
(52) U.S. Cl.
  CPC .......... *G01N 29/12* (2013.01); *G01N 29/226* (2013.01); *G01N 2291/0258* (2013.01); *G01N 2291/048* (2013.01); *G01N 2291/102* (2013.01); *G01N 2291/2691* (2013.01)
(58) Field of Classification Search
  CPC ............... G01N 29/24; G01N 29/245; G01N 2291/0258; G01N 2291/048; G01N 2291/102; G01N 2291/2691
  See application file for complete search history.

(56) References Cited

U.S. PATENT DOCUMENTS

| | | | |
|---|---|---|---|
| 9,030,206 B2* | 5/2015 | Anderson | G01L 5/24 702/182 |
| 10,215,733 B2* | 2/2019 | Etoh | G01N 29/46 |

FOREIGN PATENT DOCUMENTS

| | | | |
|---|---|---|---|
| CN | 205333133 U | 6/2016 | |
| KR | 101264375 B1 * | 5/2013 | G01B 7/18 |

OTHER PUBLICATIONS

Zhang, et al., "A Feasibility Study on Timber Moisture Monitoring Using Piezoceramic Transducer-Enabled Active Sensing", Sensors, 2018, 18, 12 pages.

Han, et al., "Damage Detection of Common Timber Connections Using Piezoceramic Transducers and Active Sensing", Sensors, 2019, 19, 12 pages.

Park, et al., "Overview of Piezoelectric Impedance-Based Health Monitoring and Path Forward", The Shock and Vibration Digest, vol. 35, No. 6, Nov. 2003, pp. 451-463.

Ritdumrongkul, et al., "Quantitative health monitoring of bolted joints using a piezoceramic actuator-sensor", Smart Materials and Structures, 2004, 13, pp. 20-29.

Nguyen, et al., "Wireless SHM for Bolted Connections via Multiple PZT-Interfaces and Imote2-Platformed Impedance Sensor Node", The 6th International Workshop on Advanced Smart Materials and Smart Structures Technology, 2011, 12 pages.

Liang, et al., "Coupled Electro-mechanical Analysis of Adaptive Material Systems—Determination of the Actuator Power Consumption and System Energy Transfer", Journal of Intelligent Material Systems and Structures, 5(1), 1994, pp. 12-20.

Mascarenas, et al., "A low-power wireless sensing device for remote inspection of bolted joints," Proceedings of the Institution of Mechanical Engineers G, vol. 223, No. 5, 2009, 27 pages.

Notification of Transmittal of the International Search Report and the Written Opinion of the International Search Authority—European Patent Office—for International Application No. PCT/US2019/056866, dated Jan. 31, 2020, 42 pages.

Rosiek, et al., "An Overview of Electromechanical Impedance Method for Damage Detection in Mechanical Structures", 6th European Workshop on Structural Health Monitoring, Jul. 3-6, 2012, 8 pages.

Database WPI—Thompson Scientific, London, GB, "XP-002797037", Aug. 13, 2014, 1 page.

Database WPI—Thompson Scientific, London, GB, "XP-002797038", Dec. 5, 2012, 1 page.

Database WPI—Thompson Scientific, London, GB, "XP-002797039", Sep. 9, 2009, 1 page.

Majid, et al., "A Review Paper on Looseness Detection Methods in Bolted Structures", Latin American Journal of Solids and Structures, 2017, 24 pages.

Notification of Transmittal of the International Preliminary Report on Patentability containing the Written Opinion of the International Search Authority—European Patent Office—for International Application No. PCT/US2019/056866, dated Apr. 29, 2021, 9 pages.

\* cited by examiner

PORTABLE SYSTEM FOR PZT-BASED INSPECTION OF BOLTED CONNECTIONS

This application claims priority to U.S. Provisional Patent Application Ser. No. 62/747,382, entitled "Portable System for PZT-Based Inspection of Bolted Connections," filed Oct. 18, 2018, the entire contents of which are hereby incorporated by reference.

BACKGROUND

This disclosure pertains to systems and methods for inspecting bolt connections.

Bolt connections are the most commonly used connection element in structures and devices of the oil and gas industry. Bolted connections commonly fail due to insufficient or excessive preloads during installation or a loss of axis load (i.e., self-loosening) caused by external dynamic loads in service. Harsh environment and vibrations will cause the bolt connections, particularly in valves, to loosen over time. Loose valves tend to make a lot of noise and accelerate wear and tear. Failure to achieve perfect sealing could cause leaking of hydrocarbons in the ocean and could create severe problems—both environmental and financial.

One of the most pressing matters regarding integrity assessment in the oil and gas industry is the inspection and monitoring of bolted connections, including flanged joints. The connections help to integrate miles of pipelines together, and are often a weak point in the pipeline system. A weakening of the connection can lead to leakage of pipeline contents, which is harmful to the economy of the operating company as well as the health of the environment. Despite the availability of many testing methods, there is still a need for a product that can rapidly, effectively and non-invasively inspect the integrity of a bolted connection.

Currently, most bolt connection inspections use complicated equipment that requires the use of an experienced technician or is too expensive for most users. Furthermore, for harsh, remote environments such as the deep sea, inspection of bolted joints becomes even harder and costlier. Most of the typical methods require permanent installation of transducers onto or near the bolted connections, which may be difficult to maintain for remote locations.

SUMMARY

The present disclosure relates generally to systems and methods for inspecting bolted connections in harsh conditions.

In the present disclosure, piezoelectric impedance methods are used to monitor bolted connections. Piezoceramics are a type of piezoelectric material that generate an electric charge when subjected to a stress or strain and also produce a stress and strain when an electric field is applied. Due to this special piezoelectric property, piezoceramics can be utilized as both an actuator and a sensor. In preferred embodiments described herein, PZT (lead zirconate titanate), a type of commonly used piezoceramic material with high piezoelectric effect, is used.

Various piezo based techniques, such as acoustic emission, impedance analysis, active and passive sensing can be used for structural health monitoring (SHM) of various structures. Among these, a piezo based active sensing approach for metal structures has shown potential to detect and characterize even minute structural damages. In an active sensing approach, one or several transducers can be utilized as actuators which generate guided waves to the surrounding structure or media. Other transducers are used as sensors to detect the wave response. Since the material properties of the structure or media affects the wave propagation, the change of the material properties due to material change or structural change can be detected by analyzing the signal responses.

The present systems and methods transform piezo-based monitoring techniques into portable systems and methods. Previously, piezoelectric elements required permanent bonding onto a structure in order to properly transmit stress waves across the structure to be received by other piezoelectric elements. Analysis of the stress waves allowed the operator to infer the status of the structure. The PZT transducers utilized in present embodiments are mounted on opposing ends of spring-loaded rods and can be moved apart to accommodate a structure for testing. The springs cause the PZT transducers to push against opposing parts of the structure in a stable but temporary fashion. The device can be physically moved to monitor the status and health of multiple different bolted connections. In preferred embodiments, the piezoelectric elements may be attached to the "biting" ends of a C-shaped fixture. As the fixture clamps onto a structure (e.g., a flange), the piezoelectric elements can perform their inspection using the aforementioned monitoring methods (i.e. active sensing and impedance). One pair of PZT transducers can conduct active sensing, as one transducer generates vibrations that travel across the structure as stress waves and the distally placed second transducer receives these waves. Analysis of the received waves gives insight into the status of the structure. The electromechanical impedance method can also be utilized through either one of the PZT transducers by analyzing the shifts in frequency. After completion of the inspection, the fixture can be loosened and used to inspect another structure. This system can be integrated with robotic vehicles, such as autonomous underwater vehicles (AUVs) for automated inspection of remote bolted structures.

The present systems and methods allow for a quantitative inspection of bolted joints or other structural interfaces without any permanent installation. As the data can be easily processed by a computer, no expert is needed to properly use the technology. Thus, the present systems and methods make structural monitoring/inspecting more convenient and cost-effective for determining the integrity of target structures.

DETAILED DESCRIPTION OF PREFERRED EMBODIMENTS

The present disclosure relates to inspecting bolted connections.

The conventional way using lead zirconate titanate (PZT) transducers (or any piezoelectric material) is to permanently install them onto the surface of a target structure to conduct related measurements. However, this requires an abundance of transducers for different locations of monitoring a large structure. It is also difficult to replace defective transducers if the structure is located in a remote environment. The present disclosure pertains to a portable and noninvasive inspection device in order to overcome these difficulties.

In preferred embodiments, an exemplary portable coupling mechanism includes at least two adjacent PZT transducers, each attached to an end of a rod, with an insulating pad between the PZT transducer and the rod. The rods are generally positioned end-to-end in a linear fashion, where the ends that meet are the ends with the PZT transducers, and are mounted on a fixture. The rods each have a spring or other mechanism that forces the transducer ends together. The fixture may generally be C-shaped, or may have parallel arms. The fixture allows the rods to move away from each other in a linear fashion, in order to separate the transducer ends and allow a test structure to be placed between the PZT transducers. The force from the springs causes the transducer ends to compress against the test structure.

Figure 1:
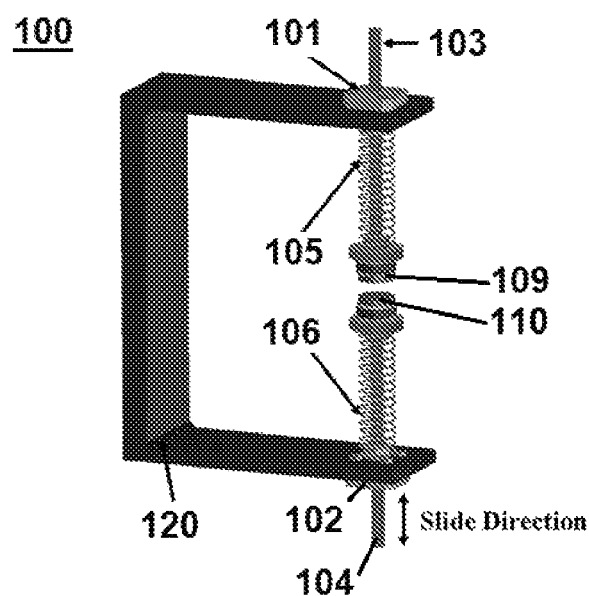
FIG. 1 shows a configuration of an exemplary portable coupling mechanism for PZT based inspecting in accordance with preferred embodiments described herein.

FIG. 1 shows a configuration of an exemplary portable coupling mechanism 100 for PZT based inspection. The portable device 100 consists of a fixture 120, such as the illustrated C-shaped steel fixture, which holds a set of two linear ball bearings, a first linear ball bearing 101 and a second linear ball bearing 102, a first shaft rod 103 and a second shaft rod 104, a first spring 105 and a second spring 106, and a first PZT transducer 109 and a second PZT transducer 110, which may be waterproof.

Figure 2:
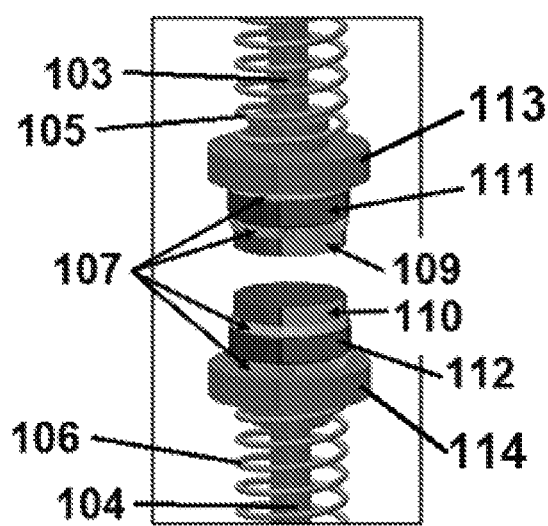
FIG. 2 shows a closer view of PZT transducers in an exemplary portable coupling mechanism for PZT based inspecting in accordance with preferred embodiments described herein.
Figure 3:
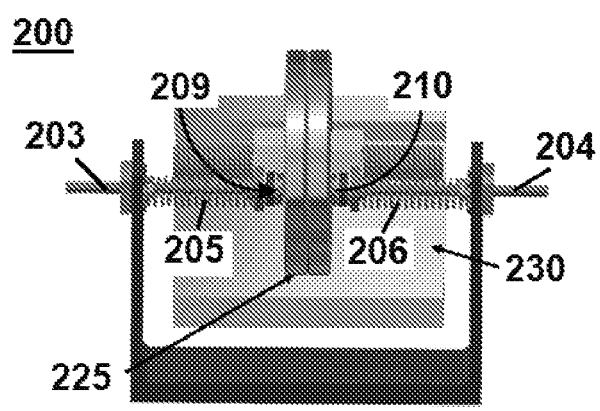
FIG. 3 shows a configuration of an exemplary portable coupling mechanism for PZT based inspecting in accordance with preferred embodiments described herein, in use in an exemplary inspection application in air and in water.

FIG. 2 shows a closer view of a first transducer end 113 and a second transducer end 114 of the first and second rods 103 and 104 and the springs 105 and 106, with insulating pads 107 between the PZT transducers 109 and 110 and the ends of the rods, and with a first magnet 111 and a second magnet 112. The PZT transducers 109 and 110 rest adjacent to each other as the springs 105 and 106 push them together. The shaft rods 103 and 104 can be separated, or pulled back away from each other, to utilize the inspection device to inspect a structure. This is shown in greater detail in FIG. 3, showing a configuration of an exemplary portable coupling mechanism 200 for PZT based inspecting in accordance with preferred embodiments described herein, in use in an exemplary inspection application in air and in water. Once the rods 203 and 204 are released, the springs 205 and 206 push the PZTs 209 and 210 against the bolted connection 225 to allow effective coupling for inspection tasks. The rubber pads 207 absorb the opposite signal from transducers 209 and 210 to ensure the received signals are exclusively from the generated waves traveling across the structure. Therefore, based on a pair of PZT transducers 209 and 210, active sensing is used. One transducer 209 acts as an actuator to generate stress waves, such as a swept-sine wave with an amplitude of 10V from 1000 Hz to 350 kHz, that travel across the bolted connection 225, and the waves are received by a distally placed second transducer 210 that acts as a sensor. A base support 230 may also be included. The inspecting device should preferably also include connectors or other devices (not shown) with sensing and transmitting abilities in communication with to the PZT transducers to receive and transmit signals providing information about the characteristics of the bolted connection.

Figure 4:
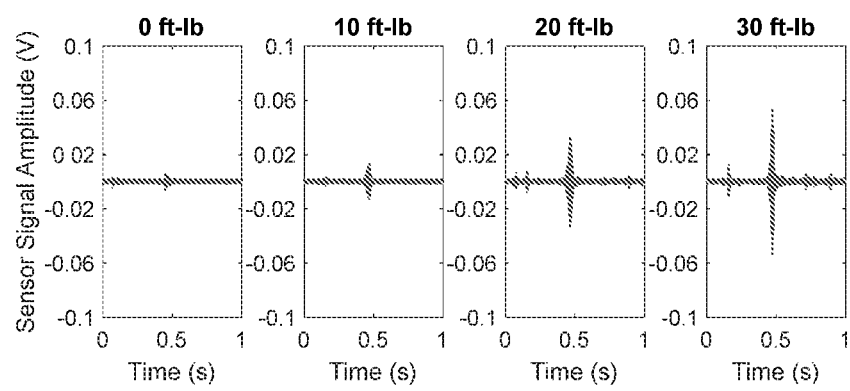
FIG. 4 shows experimental results for an active sensing method to inspect a series of torques applied on a tested bolted connection in air, using an exemplary portable coupling mechanism for PZT based inspection.
Figure 5:
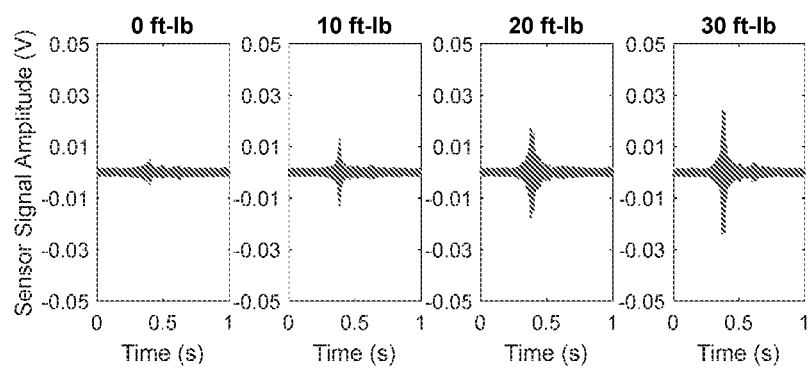
FIG. 5 shows experimental results for an active sensing method to inspect a series of torques applied on a tested bolted connection in water, using an exemplary portable coupling mechanism for PZT based inspection.

An example of inspection data using the exemplary inspecting device is shown in FIG. 3. FIG. 4 shows the results of using the active sensing method corresponding to a series of torques applied on the bolted connections in air. In this example, as shown in FIG. 4, the strength of received signal increases as torque is applied from 0 to 30 ft-lb on the bolt. A similar experiment was conducted underwater as well, as shown in FIG. 5. The result clearly demonstrates that signal strength correlates highly with the applied torque. Therefore, such analysis of the received waves gives insight into the status of the structure.

Figure 6:
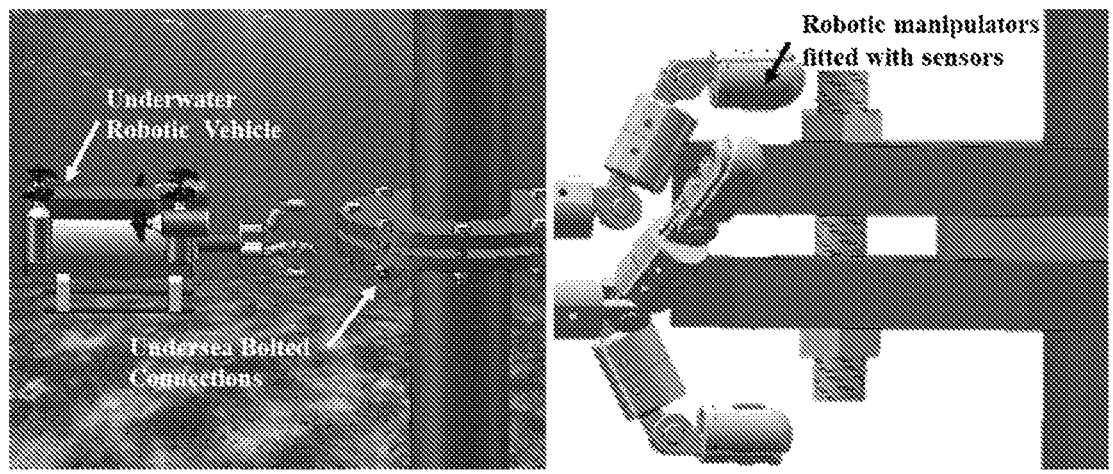
FIG. 6 shows an exemplary use of an exemplary portable coupling mechanism based inspection device, integrated with sensors and incorporated with a remotely operated vehicle (ROV) for remotely inspecting subsea bolted structures.

FIG. 6 shows an exemplary use of the exemplary portable coupling mechanism based inspection device, which is an alternative embodiment of the design shown in FIGS. 1-3 that acts as a more advanced manipulator model integrated with sensors and incorporated with a remotely operated vehicle (ROV) for remotely inspecting subsea bolted structures.

REFERENCES CITED

C. Liang, F. P. Sun, and C. A. Rogers, "Coupled Electromechanical Analysis of Adaptive Material Systems—Determination of the Actuator Power Consumption and SystemEnergy Transfer", Journal of Intelligent Material Systems and Structures, 5(1): 12-20, 1994.

G. Park, H. H. Cudney, and D J Inman, "Feasibility of using impedance-based damage assessment for pipeline structures," *Earthquake Engineering & Structural Dynamics*, vol. 30, no. 10, pp. 1463-1474, 2001.

G. Park, H. Sohn, C. R. Farrar, and D J Inman, "Overview of piezoelectric impedance-based health monitoring and path forward", Shock and Vibration Digest, 35(6): 451-464, 2003.

S. Ritdumrongkul, M. Abe, Y. Fujino, and T. Miyashita, "Quantitative health monitoring of bolted joints using a piezoceramic actuator-sensor", Smart Materials and Structures, 13(1): 20, 2004.

D. L. Mascarenas, G. Park, K. M. Farinholt, M. D. Todd, and C. R. Farrar, "A low-power wireless sensing device for remote inspection of bolted joints," *Proceedings of the Institution of Mechanical Engineers G*, vol. 223, no. 5, pp. 565-575, 2009.

K. D. Nguyen, S. Y. Lee, P. Y. Lee et al., "Wireless SHM for bolted connections via multiple PZT-interfaces and Imote2—platformed impedance sensor node," in *Proceedings of the 6th International Workshop on Advanced Smart Materials and Smart Structures Technology (ANCRiSST '11)*, 2011.

F. Han, J. Jiang, K. Xu, and N. Wang. "Damage Detection of Common Timber Connections Using Piezoceramic Transducers and Active Sensing." Sensors 19, no. 11, 2486, 2019.

J. Zhang, Y. Li, Y. Huang, J. Jiang, and S. C. Ho. "A feasibility study on timber moisture monitoring using piezoceramic transducer-enabled active sensing." *Sensors* 18, no. 9, 3100, 2018.

What is claimed is:

1. A portable system for inspecting characteristics of a bolted connection, comprising:
   a first PZT transducer;
   a second PZT transducer movably positioned adjacent to the first PZT transducer;
   a first rod having a first transducer end on which the first PZT transducer is mounted and having a first spring for applying a force on the first rod to move the first PZT transducer toward the second PZT transducer;
   a second rod having a second transducer end on which the second PZT transducer is mounted and having a second spring for applying a force on the second rod to move the second PZT transducer toward the first PZT transducer, wherein the second rod is movably positioned in a linear fashion adjacent to the first rod;
   a fixture on which the first rod and the second rod are movably mounted, wherein the fixture connects to ends of the first spring and the second spring, wherein compressive forces from the first spring and the second spring cause the first PZT transducer and the second PZT transducer to move toward each other, and wherein movement of the first rod away from the second rod compresses the first spring and the second spring against the fixture and permits placement of at least a portion of a bolted connection between the first PZT transducer and the second PZT transducer.

2. The portable system of claim 1, further comprising insulating pads located between the first PZT transducer and the first transducer end of the first rod and insulating pads located between the second PZT transducer and the second transducer end of the second rod.

3. The portable system of claim 1, further comprising devices in communication with the PZT transducers to transmit signals providing information about the characteristics of the bolted connection.

4. The portable system of claim 1, wherein the first PZT transducer, the second PZT transducer, the first rod, the second rod, the fixture, and the connectors are waterproof.

5. The portable system of claim 1, wherein the first PZT transducer acts as an actuator and the second PZT transducer acts as a sensor.

6. The portable system of claim 1, wherein the fixture comprises linear ball bearings accommodating the first rod and the second rod.

7. The portable system of claim 1, wherein the fixture is C-shaped.

8. A method for inspecting characteristics of a bolted connection, comprising:
   (a) transiently attaching a portable system to at least a portion of a bolted connection, wherein the portable system comprises a first PZT transducer, a second PZT transducer movably positioned adjacent to the first PZT transducer, a first rod having a first transducer end on which the first PZT transducer is mounted and having a first spring for applying a force on the first rod to move the first PZT transducer toward the second PZT transducer, a second rod having a second transducer end on which the second PZT transducer is mounted and having a second spring for applying a force on the second rod to move the second PZT transducer toward the first PZT transducer, wherein the second rod is movably positioned in a linear fashion adjacent to the first rod, a fixture on which the first rod and the second rod are movably mounted, wherein the fixture connects to ends of the first spring and the second spring, and connectors attached to the PZT transducers,
   wherein the portable system is transiently attached to at least a portion of the bolted connection by moving the first rod away from the second rod to separate the first PZT transducer from the second PZT transducer, by positioning the portion of the bolted connection between the first PZT transducer and the second PZT transducer and by releasing the first rod and the second rod, whereby compressive forces from the first spring and the second spring cause the first PZT transducer and the second PZT transducer to move toward each other and to contact opposing positions on the portion of the bolted connection;
   (b) transmitting signals from the PZT transducers through the connectors to provide information about the characteristics of the bolted connection;
   (c) removing the portable system from the bolted connection; and
   repeating steps (a) and (b) for additional bolted connections using the portable system.

9. The method of claim 8, wherein the portable system further comprises a first insulating pad located between the first PZT transducer and the first transducer end of the first rod and a second insulating pad located between the second PZT transducer and the second transducer end of the second rod.

10. The method of claim 8, wherein steps (a), (b), and (c) are performed underwater.

11. The method of claim 8, wherein the first PZT transducer acts as an actuator and the second PZT transducer acts as a sensor.

12. The method of claim 8, wherein the fixture comprises linear ball bearings accommodating the first rod and the second rod.

13. The method of claim 8, wherein the fixture is C-shaped.

* * * * *